United States Patent Office 3,690,840
Patented Sept. 12, 1972

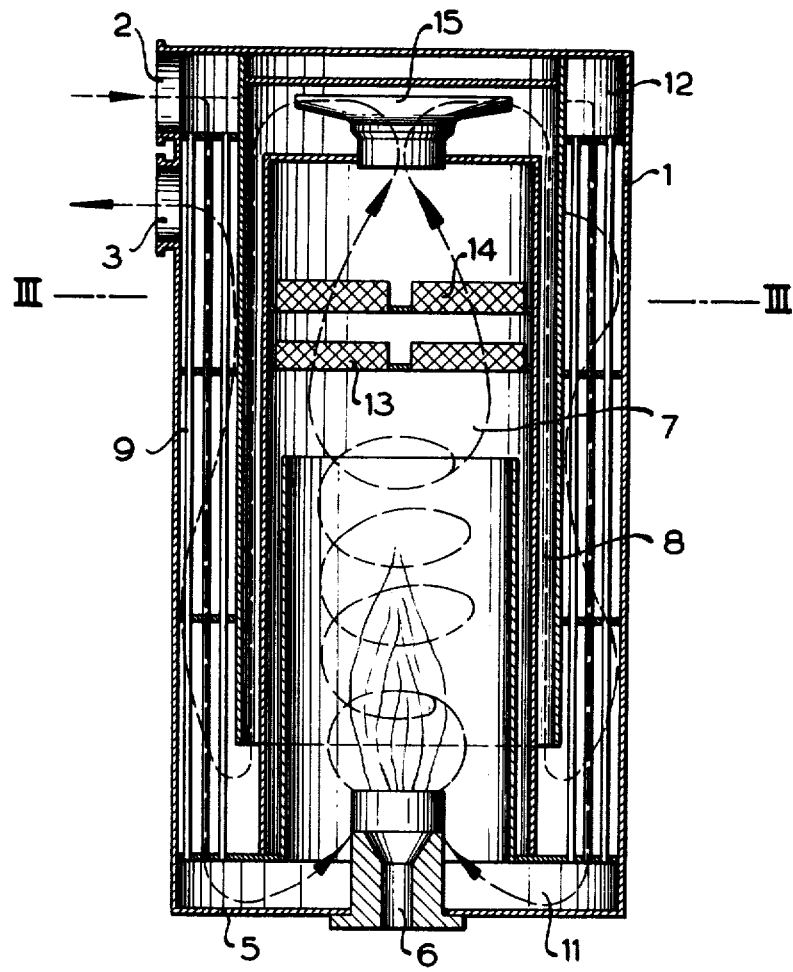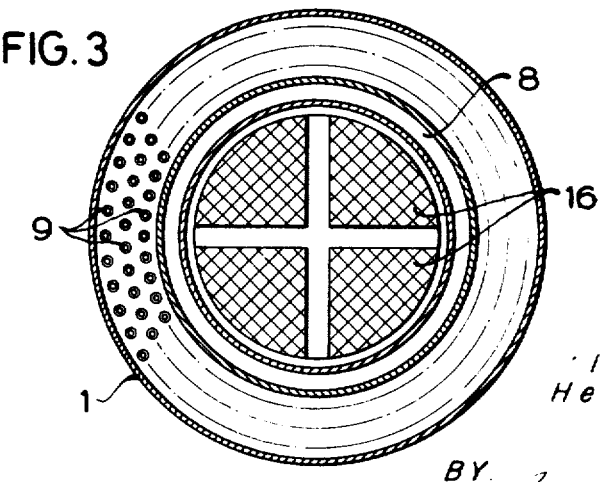

3,690,840
APPARATUS FOR INCINERATING WASTE GASES
Herbert Volker, 43 Bogenstrasse,
6451 Wolfgang, Germany
Filed Aug. 24, 1970, Ser. No. 66,200
Claims priority, application Germany, Jan. 16, 1970,
P 20 01 933.4
Int. Cl. F23g 7/06; B01g 9/04
U.S. Cl. 23—277 C          8 Claims

ABSTRACT OF THE DISCLOSURE

A cylindrical form thermal-catalytic incinerator unit for treating waste gas streams. The catalytic bed traverses the downstream end of the combustion chamber to effect contact with the mixture of waste gases and burner products from a burner axially positioned at the opposing inlet end of the combustion chamber. An annular heat exchange section around the combustion zone provides for cooling the resulting oxidized gas stream and for preheating the incoming noxious stream which is then fed circumferentially around the burner to admix with the flame and hot gases therefrom.

---

Figure 1:
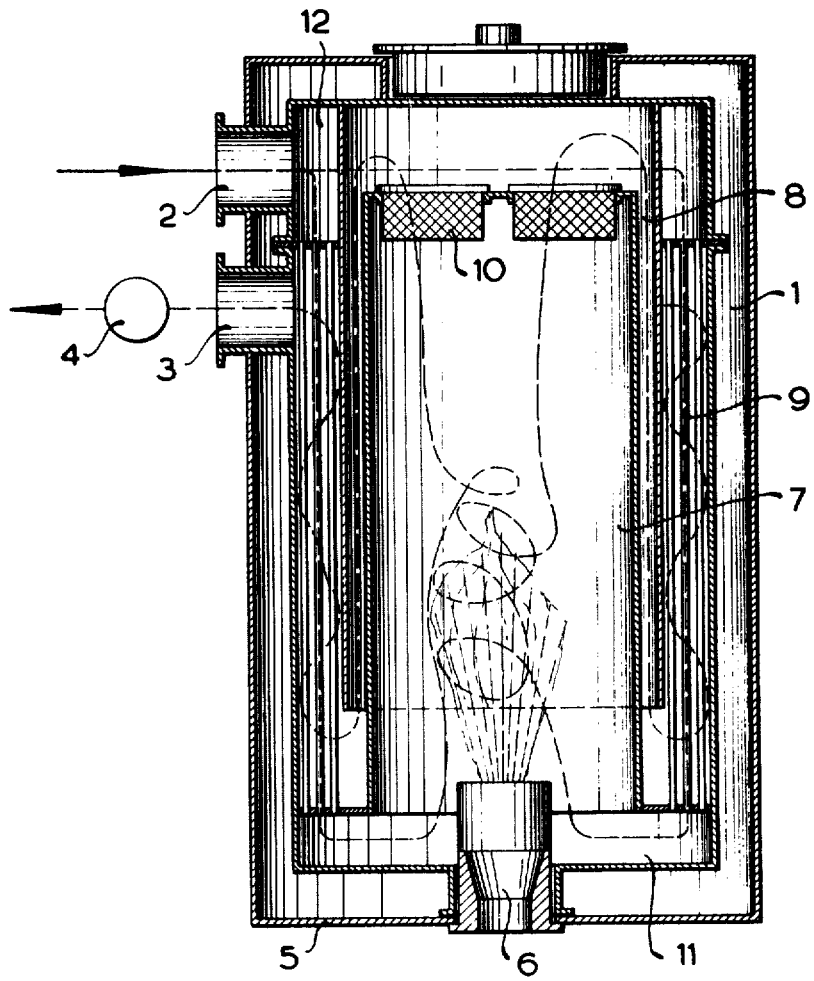

The invention relates to an apparatus for carrying out catalytic gas reactions and especially for incineration of oxidizable components in waste gases.

Rectangularly shaped apparatus for direct flame incineration of oxidizable components in waste gases are known, for example, from U.S. Pat. 3,090,657 wherein a tubular heat exchanger and a combustion chamber are provided side by side within a rectangularly shaped outer casing and burner means projecting through one of the walls of said outer casing extend into the combustion chamber. Apparatus having a rectangularly shaped outer casing are also known for catalytic gas reactions and contain the catalyst in the form of one or several gas-pervious catalyst plates provided at the side of a tubular heat exchanger. However, during operation of such apparatus having a rectangular housing appreciable temperature differentials occur within the apparatus structure and result in unequal expansion of various parts of the inner lining and in strains which in turn tend to result in cracks. Moreover, the inner lining is subjected to high radiation temperatures within the zone of the burner flame, since the gas flow through the system causes only an insufficient cooling which result in scaling and damages during continuous operation.

From U.S. Pat. 3,311,456 also an apparatus for incineration of oxidizable components in waste gases is known having a cylindrical outer casing and a burner mounted centrally in one of the end walls of said casing, and an inner shell designed to form with the outer casing an annulus producing a spiral waste gas flow therethrough with the aid of spiraling baffle or vane means generally countercurrently to the flow of combustion gases through the inner shell without, however, the provision of either a plurality of heat exchange tubes or a catalytic device.

Further, from the German Pat. 940,977 an apparatus for carrying out exothermic catalytic gas reactions is known having a cylindrical outer casing and a centrally arranged tubular heat exchanger surrounded by annular catalyst beds. A similar apparatus is known from the German published patent applicaton 1,215,852, however, said apparatus comprises centrally within a cylindrical outer casing a cylindrical catalyst bed surrounded by an annular tubular heat exchanger. But, in the former case, the apparatus does not contain any burner, and in the latter case, the apparatus comprises a burner mounted within the superficies of the cylindrical outer casing and said burner extends into a combustion chamber above the cylindrical catalyst bed and the annular tubular heat exchanger.

It is an object of the present invention to overcome the disadvantages of the known catalytic incinerators, especially for the incineration of waste gases and to obtain an apparatus for catalytic gas reactions, wherein all structural components are arranged compactly and in a manner minimizing stresses and damages of the inner lining and parts of the casing due to appropriate arrangement of the cooling means.

According to the invention, the apparatus for carrying out catalytic gas reactions, preferably for incineration of oxidizable components in waste gases having an outer casing, a burner mounted in one of the end walls of said outer casing and extending into a combustion chamber, a tubular heat exchanger arranged within said outer casing and a catalyst is characterized in that the outer casing is formed cylindrically and comprises the burner centrally in one of its ends walls, the tubular heat exchanger is arranged annularly and surrounds the combustion chamber, the end of the tubular heat exchanger in proximity of the burner is connected with the combustion chamber and the end of the tubular heat exchanger remote from the burner is connected with the gas inlet, a catalyst layer is disposed within the section of the combustion chamber remote from the burner and the space between the heat exchanger tubes is connected with the combustion chamber in the range of the one end of the tubular heat exchanger and is connected with the gas outlet in the range of the opposite end of the tubular heat exchanger.

The tubular heat exchanger and the combustion chamber are separated from each other by a partition wall. According to a preferred embodiment of the invention a confined annular space is provided between the combustion chamber and the tubular heat exchanger, said annular space being formed by a double-walled partition wall, the inner and outer walls of which are spaced uniformly from each other. The end of said annular space remote from the burner is connected with the combustion chamber, while the other end of said annular space is in open communication with the space between the heat exchanger tubes in proximity of the burner. Said space between the heat exchanger tubes in turn is connected at its opposite extremity with the gas outlet. In this embodiment, a dual countercurrent flow of the gases entering the apparatus and leaving the apparatus is obtained by the combination of the double walled partition wall and the tubular heat exchanger and this results on the one hand in a maximum cooling effect for the outer casing and the inner lining and on the other hand in a maximum efficiency of energy utilization.

The catalyst bed or layer can be provided in various different forms and can be, for example, in the form of a hollow cylinder which is traversed by the gases from the outside inwardly or from within outwardly. However, preferbaly, the catalyst layer has the form of a solid cylinder which is traversed by the gases in the direction of the cylinder axis. Suitably, the cylinder axis is shorter than the diameter of the cylinder, so that the catalyst layer has a disk-like form. Optionally, several of such disk-like catalyst layers can be arranged one behind the other.

The catalyst bed or layers can be arranged within the combustion chamber, however, to more easily exchange or replace the catalyst when spent, it is more advantageous to arrange the catalyst layer in a manner defining the end portion of the combustion chamber remote from the burner. Further, in order to facilitate the exchange of the catalyst bed, it is suitable to sub-divide the disk-like catalyst cylinder to form several segments which are individually removable and exchangeable.

Reference to the accompanying drawing will serve to further illustrate the invention.

FIG. 1 of the drawing is a longitudinal section of a preferred embodiment of the apparatus according to the invention.

FIG. 2 of the drawing is a longitudinal section of another embodiment of the apparatus according to the invention.

FIG. 3 is a lateral section along line III—III of the apparatus according to FIG. 2.

The apparatus shown in FIG. 1 has a cylindrical outer casing 1 having a gas inlet 2 and a gas outlet 3 communicating with a ventilator or exhaust blower 4. In the front wall 5 of the outer casing 1 a burner 6 is provided which extends into the combustion chamber 7. The combustion chamber 7 is surrounded by an annular space 8 and said space is surrounded by an annular tubular heat exchanger 9. The end of the combustion chamber 7 remote from the burner is defined by the catalyst bed 10 which has the form of a disk-like complete cylinder of smaller thickness than diameter and is subdivided into individual segments.

The open-ended heat exchanger tubes of the tubular heat exchanger 9 at one end thereof are in open communication with the gas inlet 2, and at the opposite end of the heat exchanger 9 the tubes thereof are open to an annular space 11 which is in turn connected with the combustion chamber 7. The space between the heat exchanger tubes of the tubular heat exchanger 9 has an open connection with the gas outlet 3 at its one end and with the annular space 8 at its other end.

During operation of the apparatus according to FIG. 1 for incinerating oxidizable components in waste gases, the waste gases to be purified enter the annular distributing header 12 through the gas inlet 2 and pass from there through the heat exchanger tubes into the annular space 11, from where they are deflected into the combustion chamber 7. There, they are commingled with the hot combustion gases of the burner 6, whereby the temperature of the waste gases is raised to the temperature necessary for the catalytic incineration. A portion of the oxidizable components is already incinerated within the combustion chamber 7, while the remainder of the oxidizable components is incinerated during passage through the catalyst bed 10. Upon issuing from the catalyst bed 10, the gas stream is deflected again and passes through the annular space 8 and then through the space between the tubes of the tubular heat exchanger 9 to the gas outlet 3. Thereby, the gases leaving the apparatus flow within the tubular heat exchanger 9 countercurrently to and in indirect heat exchange with the gases entering the apparatus and thereby heat the cold gases entering the apparatus and passing through the heat exchanger tubes.

In the embodiment of the apparatus according to the invention shown by FIG. 2, the parts corresponding to those of FIG. 1 have the same reference numerals as in FIG. 1. The apparatus of FIG. 2 is distinguished from that of FIG. 1 thereby that it contains two catalyst beds 13 and 14 which are arranged spaced one behind the other in axial alignment within the combustion chamber in an end portion thereof remote from burner 6. At the end of the combustion chamber 7 downstream of the last catalyst bed, a distributor 15 is provided immediately above the catalyst chamber for substantially uniformly deflecting the gaseous effluent of the catalyst beds into the annular space 8 and over the entire cross-section of the latter.

The cross section along the line III—III shown by FIG. 3 for the apparatus according to FIG. 2 illustrates the provision of the catalyst bed 14 in the form of four segments 16 which are removable individually from the apparatus. The cylindrical catalyst bed 10 of the apparatus shown in FIG. 1 is similarly segmented for ease of installation and removal. The function of the apparatus shown in FIGS. 2 and 3 is the same as that of the apparatus according to FIG. 1.

I claim as my invention:

1. A thermal-catalytic apparatus for incinerating oxidizable components in a waste gas stream, which comprises in combination, an elongated cylindrical-form casing, said casing having a burner extending axially through one end thereof and a closed end opposing the burner, a first interior shell spaced from the outer casing and extending for a major portion of the length thereof to thereby form an elongated internal combustion chamber, an additional second shell spaced around said first interior shell and forming a first elongated annular space therearound, a third shell spaced around said second shell to form an additional annular space comprising a heat exchange section, a plurality of spaced tubes in said heat exchange section to provide one gas passageway means through said tubes and a second gas passageway means around said tubes, a waste gas inlet to said casing adjacent the closed end thereof and connecting with one of the gas passageway means in said heat exchange section, such passageway means discharging circumferentially around said burner via said second shell to thereby provide that the preheated gas flow reverses direction and passes through the combustion chamber in admixture with the flame and hot combustion gases, at least one permeable catalyst containing section positioned at the downstream end of said combustion chamber and spaced from an end portion of said casing, an oxidized gas collection and transfer section from the downstream side of said catalyst layer connective with said first elongated annular space to feed therethrough in reverse direction and thence in again reverse direction through said heat exchange section by providing flow of the resulting hot gas stream therethrough in the other of said passageway means, whereby to be in heat exchange relationship with the incoming waste gas stream, and gas outlet means from the downstream end of last said passageway means and from said casing.

2. The thermal-catalytic apparatus of claim 1 still further characterized in that said annular space is in heat exchange relationship with and around said combustion chamber and within said annular heat exchange section, with hot oxidized gas flow in such annular space being the reverse of that in said combustion chamber and in the same direction for flow through the heat exchange section, and the oxidized gas outlet means from the latter is at the same end of said casing as the waste gas inlet thereto.

3. The thermal-catalytic apparatus of claim 1 further characterized in that said catalyst containing section is in the form of a disk-like layer traversing the downstream end of said combustion chamber.

4. The thermal-catalytic apparatus of claim 3 still further characterized in that said catalyst layer is segmented and each segment thereof is supported to be individually replaceable.

5. The thermal-catalytic apparatus of claim 1 further characterized in that said catalyst containing section comprises a plurality of spaced apart disk-like layers traversing the downstream end of said combustion chamber to provide a series of gas stream contacts.

6. The thermal-catalytic apparatus of claim 5 still further characterized in that said catalyst layers are segmented and each segment thereof is supported to be individually replaceable.

7. The thermal-catalytic apparatus of claim 1 still further characterized in that the catalyst containing section comprises a hollow cylindrical form layer whereby the hot gas stream flows radially therethrough from the downstream end of the combustion chamber.

8. The thermal-catalytic apparatus of claim 1 still further characterized in that the gas colllection and transfer section is provided with gas deflector means providing uniform distribution of hot gases from the combustion chamber to said heat exchange section.

References Cited

UNITED STATES PATENTS

| 3,549,333 | 12/1970 | Tabak | 23—277 C |
| 3,468,634 | 9/1969 | Pauletta | 23—288 F |
| 2,317,449 | 4/1943 | Flock | 23—288 R |
| 1,789,812 | 1/1931 | Frazer | 23—288 F |

JAMES H. TAYMAN, Jr., Primary Examiner

U.S. Cl. X.R.

23—288 F, 288 K, 2 C; 110—8 A; 165—66